United States Patent
Stenneth et al.

(10) Patent No.: US 11,892,303 B2
(45) Date of Patent: Feb. 6, 2024

(54) APPARATUS AND METHODS FOR PREDICTING STATE OF VISIBILITY FOR A ROAD OBJECT

(71) Applicant: HERE GLOBAL B.V., Eindhoven (NL)

(72) Inventors: Leon Stenneth, Chicago, IL (US); Jerome Beaurepaire, Berlin (DE); Jeremy Young, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 457 days.

(21) Appl. No.: 17/331,183

(22) Filed: May 26, 2021

(65) Prior Publication Data

US 2022/0381565 A1    Dec. 1, 2022

(51) Int. Cl.

| | | |
|---|---|---|
| *G06F 17/00* | (2019.01) | |
| *G01C 21/34* | (2006.01) | |
| *H04W 4/024* | (2018.01) | |
| *G06N 20/00* | (2019.01) | |
| *G08G 1/0967* | (2006.01) | |
| *H04W 4/48* | (2018.01) | |

(52) U.S. Cl.
CPC ......... *G01C 21/3415* (2013.01); *G06N 20/00* (2019.01); *G08G 1/096725* (2013.01); *H04W 4/024* (2018.02); *H04W 4/48* (2018.02)

(58) Field of Classification Search
CPC ............ G01C 21/3415; G01C 21/3461; G01C 21/3697; G01C 21/3811; G06N 20/00; G08G 1/096725; G08G 1/0112; G08G 1/012; G08G 1/0133; G08G 1/096716; G08G 1/096775; G08G 1/0129; G08G 1/0141; G08G 1/096741; H04W 4/024; H04W 4/48; H04W 4/44
USPC .......................................................... 701/415
See application file for complete search history.

(56) References Cited

U.S. PATENT DOCUMENTS

| | | | | |
|---|---|---|---|---|
| 8,896,465 | B2 * | 11/2014 | Raz ..................... | G07C 5/0808 340/905 |
| 9,187,099 | B2 | 11/2015 | Powers et al. | |
| 9,552,726 | B2 * | 1/2017 | McGrath ............ | G08G 1/09675 |
| 10,325,490 | B2 * | 6/2019 | McGrath .......... | G08G 1/096775 |
| 10,453,337 | B2 * | 10/2019 | Anastassov ...... | G08G 1/096758 |
| 10,493,986 | B2 | 12/2019 | Ratcliffe | |

(Continued)

FOREIGN PATENT DOCUMENTS

EP    3226219 A1    10/2017

OTHER PUBLICATIONS

Predictor Variables Influencing Visibility Prediction (Year: 2023).*

(Continued)

*Primary Examiner* — Ronnie M Mancho
(74) *Attorney, Agent, or Firm* — Peter H. Yu; HERE GLOBAL B.V.

(57) ABSTRACT

A method, apparatus and computer program product are provided for predicting a state of visibility for a road object. For example, at least one processor receives road sign attribute data indicating at least one attribute of a road sign. The processor further receives weather forecast data indicating a weather forecast of a location in which the road sign is disposed, and using the road sign attribute data and the weather forecast data, a state of visibility for the road sign is identified.

21 Claims, 12 Drawing Sheets

(56) References Cited

U.S. PATENT DOCUMENTS

| | | |
|---|---|---|
| 10,762,365 B2 | 9/2020 | Ewert |
| 10,870,351 B2 | 12/2020 | Viswanathan |
| 11,467,574 B2* | 10/2022 | Ferguson .............. G06V 20/582 |
| 11,519,743 B2* | 12/2022 | Sasaki ...................... G08G 1/22 |
| 2011/0043377 A1* | 2/2011 | McGrath ................ G06V 20/54 |
| | | 340/905 |
| 2014/0093131 A1* | 4/2014 | Fan ........................ G06V 20/20 |
| | | 382/104 |
| 2016/0379485 A1* | 12/2016 | Anastassov .......... G08G 1/0129 |
| | | 701/117 |
| 2017/0148322 A1* | 5/2017 | Mcgrath ................ G06V 20/52 |
| 2020/0349368 A1 | 11/2020 | Mayster et al. |
| 2022/0082395 A1* | 3/2022 | Sasaki ..................... H04W 4/46 |
| 2022/0335730 A1* | 10/2022 | Tal ......................... H04N 7/181 |
| 2022/0380990 A1* | 12/2022 | Stenneth .................. E01F 9/40 |

OTHER PUBLICATIONS

Hasan Fleyeh, Traffic and Road Sign Recognition, Jul. 2008, Napier University.

* cited by examiner

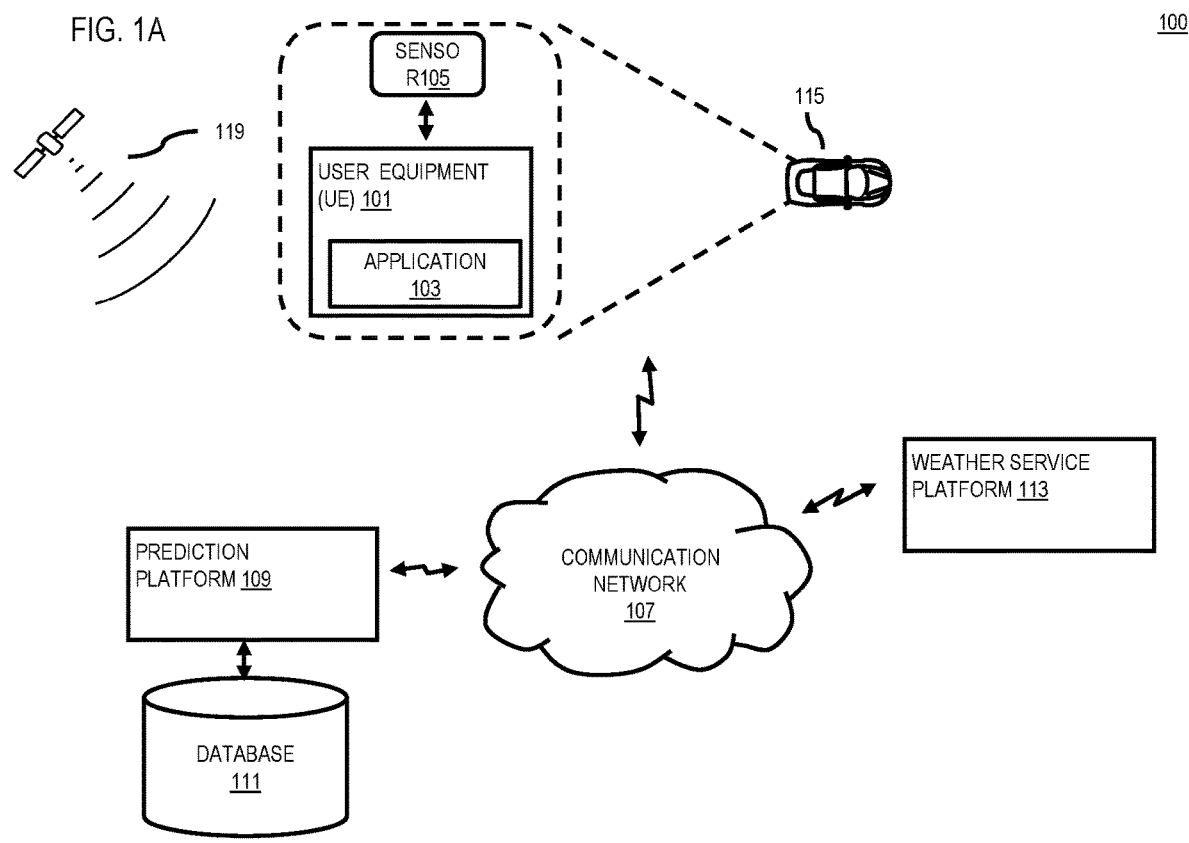

| | 701 | 703 | 705 | 707 | 709 | 711 | 713 |
| --- | --- | --- | --- | --- | --- | --- | --- |
| | Precipitation type | Precipitation rate | Precipitation intensity | Wind direction | Air temperature | Sign face angle | Ground truth |
| | Pt1 | Pr1 | Pi1 | Wd1 | At1 | Sf1 | obscured |
| | Pt2 | Pr2 | Pi2 | Wd2 | At2 | Sf2 | obscured |
| | Pt3 | Pr3 | Pi3 | Wd3 | At3 | Sf3 | Not-obscured |
| | | | | | | | |

APPARATUS AND METHODS FOR PREDICTING STATE OF VISIBILITY FOR A ROAD OBJECT

TECHNICAL FIELD

The present disclosure relates to the field of route navigation, associated methods and apparatus, and in particular concerns an apparatus configured to predict a state of visibility for a road object, such as a road sign, using attribute data and weather forecast data.

BACKGROUND

Visibility is critical for operating a vehicle. An operator of the vehicle readily identifies various objects of the road in which the vehicle is traversing. Typically, visibility of road objects, such as road signs, may be adversely impacted by severe weather conditions, thereby rendering a potential hazard for the vehicle and the environment in which the vehicle is traversing. To remedy this issue, the operator of the vehicle may refer to a map provided by a built-in navigation system or a navigation application installed on a mobile device to determine the necessary information of which the road object is designed to convey. However, acquiring such information only after discovering that the visibility of the road object has been obscured may not provide ample amount of time for the operator to process and react to that information. Also, reliance on sensors in addition to or in alternative to map data may be required or desired in various situations. Therefore, there is a need in the art for predicting and informing visibility of a road object.

The listing or discussion of a prior-published document or any background in this specification should not necessarily be taken as an acknowledgement that the document or background is part of the state of the art or is common general knowledge.

BRIEF SUMMARY

According to a first aspect, a non-transitory computer-readable storage medium includes computer program code instructions stored therein. The computer program code instructions, when executed by at least one processor, cause the at least one processor to receive road sign attribute data indicating at least one attribute of a road sign, receive weather forecast data indicating a weather forecast of a location in which the road sign is disposed, and identify a state of visibility for the road sign using the road sign attribute data and the weather forecast data.

According to a second aspect, an apparatus including at least one processor and at least one non-transitory memory including computer program code instructions is described. The computer program code instructions, when executed, causes the apparatus to receive a request for navigating a mobile device to a destination, identify a travel link to the destination, receive attribute data indicating at least one attribute of a road object associated with the travel link, and receive weather forecast data indicating a weather forecast of a location in which the road object is disposed. The instructions further cause the apparatus to, using the attribute data and the weather forecast data, identify a state of visibility for the road object.

According to a third aspect, an apparatus including at least one processor and at least one non-transitory memory including computer program code instructions is described. The computer program code instructions, when executed, cause the apparatus to predict a likelihood of at least one road sign existing within a travel link. The instructions further cause the apparatus to, for a road sign predicted to exist within the travel link, predict a location of the road sign and at least one attribute of the road sign using one or more attributes associated with the travel link, receive weather forecast data indicating a weather forecast of the location, and identify a state of visibility for the road sign using the at least one attribute and the weather forecast data.

According to a fourth aspect, a method of training a machine learning model for predicting a state of visibility for a road sign is described. The method includes receiving historical data for the road sign. The historical data includes, for each of at least one past time or duration, road sign attribute data indicating at least one attribute of the road sign, historical weather data indicating a historical weather condition of a location in which the road sign is disposed, and ground truth data indicating a true state of which sign information is displayed by the road sign. The method further includes training the machine learning model to predict the state of visibility using the historical data.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTIONS OF THE DRAWINGS

The embodiments of the invention are illustrated by way of example, and not by way of limitation, in the figures of the accompanying drawings:

FIG. 1A illustrates a diagram of a system capable of predicting a state of visibility for a road object using attribute data and weather forecast data;

FIG. 7 illustrates an example table of historical data used to train a machine learning model for predicting a state of visibility for a road object;

DETAILED DESCRIPTIONS

Figure 1B:
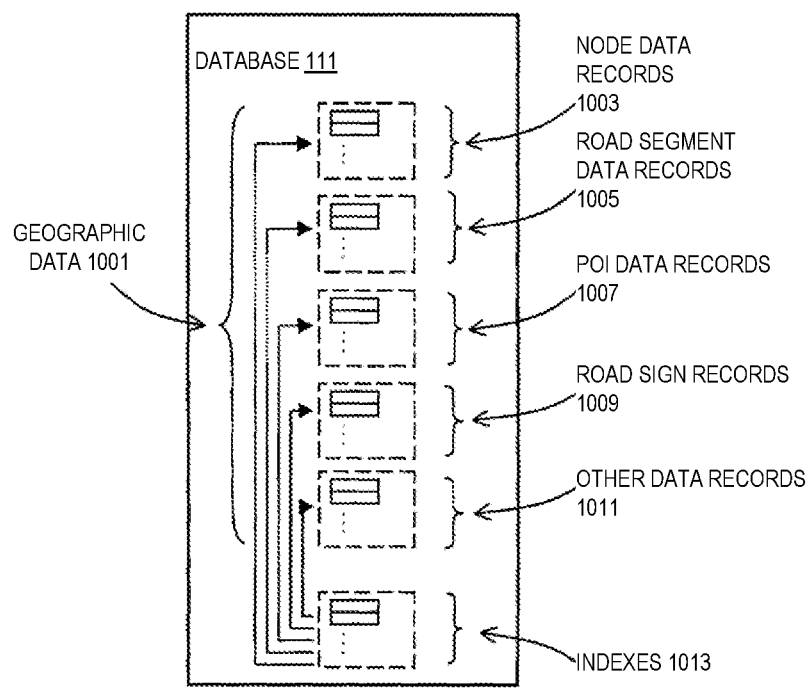
FIG. 1B illustrates a diagram of a database of the system of FIG. 1.

Visibly recognizable objects of a road environment, such as road signs, must be readily presentable to an operator of a vehicle. Under adverse weather conditions, road signs may be partially or completely obscured by snow, ice, rain, or a combination thereof. For autonomous vehicles, these vehicles may detect obscured road signs using cameras and may refer to data provided by built-in navigation systems to determine the sign information displayed by the road sign. As for human drivers, they may refer to mobile devices, such smart phones or GPS navigation devices, to determine the sign information when encountering the obscured road sign. While referring to a GPS navigation system enables vehicle operators to readily identify sign information, such solution limits the amount of time for the operator to process and react to the information. For example, an autonomous vehicle may encounter an obscured road sign that informs of a slippery road ahead. The vehicle will need time to detect the road sign, process whether the road sign is obscured, and refer to a GPS navigation system to determine the information presented by the obscured road sign. By the time that the vehicle has a chance to react, the vehicle may already be traversing the slippery section of the road. Similarly, human drivers need time to identify an obscured road sign, refer to the GPS navigation system, and react to the sign information provided by the GPS navigation system. Additionally, drivers inevitably deviate their attention from the road while referring to the GPS navigation system.

There will now be described an apparatus and associated methods that may address these issues.

FIG. 1A is a diagram of a system 100 capable of predicting a state of visibility for a road object, such as a road sign, for example, using road sign attribute data and weather forecast data, according to one embodiment.

In the illustrated embodiment, the system 100 comprises a user equipment (UE) 101 that may include or be associated with an application 103. In one embodiment, the UE 101 has connectivity to a prediction platform 109 via the communication network 107. The prediction platform 109 performs one or more functions associated with predicting a state of visibility for a road sign using road sign attribute data and weather forecast data.

In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with one or more vehicles or any combination thereof, including the accessories and peripherals of these devices, or any combination thereof. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. A user may use the device UE 101 for navigation functions, for example, road link map updates. It should be appreciated that the UE 101 can support any type of interface to the user (such as "wearable" devices, etc.). In one embodiment, the one or more vehicles may have cellular or Wi-Fi connection either through the inbuilt communication equipment or from the UE 101 associated with the vehicles. The application 103 may assist in conveying information regarding at least one object associated with a travel link via the communication network 107.

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the prediction platform 109 and perform one or more functions associated with the functions of the prediction platform 109 by interacting with the prediction platform 109 over the communication network 107.

In the illustrated embodiment, one or more sensors 105 may be any type of sensors. In certain embodiments, the sensors 105 may include, for example, a global positioning sensor for gathering location data, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., traffic sign information can be populated by highly assisted vehicles that have cameras and image recognition techniques), an audio recorder for gathering audio data, velocity sensors, and the like. In another embodiment, the sensors 105 may include light sensors, oriental sensors augmented with height sensor and acceleration sensor (e.g., an accelerometer can measure acceleration and can be used to determine orientation of the UE 101), tilt sensors to detect the degree of incline or decline of the vehicle along a path of travel, moisture sensors, pressure sensors, etc. In a further example embodiment, sensors about the perimeter of the vehicle may detect the relative distance of the vehicle from lanes or roadways, the presence of other vehicles, pedestrians, traffic lights, road features (e.g., curves) and any other objects, or a combination thereof. In one scenario, the sensors 105 may detect weather data, traffic information, or a combination thereof. In one example embodiment, the UE 101 may include GPS receivers to obtain geographic coordinates from satellites 119 for determining current location and time associated with the UE 101. Further, the location can be determined by a triangulation system such as A-GPS, Cell of Origin, or other location extrapolation technologies. In another example embodiment, the one or more sensors may provide in-vehicle navigation services, wherein one or more location-based services may be provided to the at least one vehicle and/or at least one UE 101 associated with the at least one vehicle.

In the illustrated embodiment, a vehicle 115 includes the UE 101 and the sensors 105. In one embodiment, one or more of the UE 101 and the sensor 105 is an integral component of the vehicle 115. In an alternative embodiment, one or more of the UE 101 and the sensors 105 may be physically separated from the vehicle 115. Embodiments herein will be described with respect to the UE 101 and/or the sensors 105, but it should be appreciated that the UE 101 and/or the sensors 105 can be associated with the vehicle 115 in terms of proximity (e.g., UE 101 and/or the sensors 105 being within the vehicle 115). As such, an embodiment describing the UE 101 traversing a path can be construed as the vehicle 115 and/or the sensor 105 traversing the path. The vehicle 115 may be a standard gasoline powered vehicle, a hybrid vehicle, an electric vehicle, a fuel cell vehicle, and/or any other mobility implement type of vehicle. The vehicle 115 includes parts related to mobility, such as a powertrain with an engine, a transmission, a suspension, a driveshaft, and/or wheels, etc. The vehicle 115 may be a semi-autonomous vehicle (e.g., some routine motive functions, such as parking, are controlled by the vehicle 115), or an autonomous vehicle (e.g., motive functions are controlled by the vehicle 115 without direct driver input).

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G network, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the prediction platform 109 may be a platform with multiple interconnected components. The prediction platform 109 may include multiple servers, intelligent networking devices, computing devices, components and corresponding software for determining a state of visibility for a road sign using road sign attribute data and weather forecast data. It should be appreciated that that the prediction platform 109 may be a separate entity of the system 100, a part of the weather service platform 113, or included within the UE 101 (e.g., as part of the applications 103).

In one embodiment, the prediction platform 109 predicts a state of visibility for a road object using attribute data associated with the road object and weather forecast data associated with the location of the road object. By way of example, the prediction platform 109 may identify at least one attribute of a road sign using road sign attribute data provided by a database 111. The road sign attribute data includes, at least, information regarding the location of the road sign. The prediction platform 109 receives weather forecast data from the weather service platform 113, and using the location of the road sign, the prediction platform 109 determines the weather forecast that is applicable to the location of the road sign. Then, the prediction platform 109 uses a machine learning model to identify a state of visibility for the road sign based on the attribute of the road sign and the weather forecast of the location in which the road sign is disposed. Prior to actual use, the machine learning model is trained using historical data including weather data indicating past weather conditions and ground truth data indicating true states in which the road sign was displayed. In practice, the machine learning model may be continuously trained by comparing the predicted state of visibility for the road sign and probe data including ground truth data associated with the predicted state of visibility. In one embodiment, the ground truth data may be provided by a field personnel, an autonomous vehicle including sensors for identifying the state of visibility for the road sign, or a drone deployed by a local municipality. Using the state of visibility, the prediction platform 109 may generate a level of obscureness, which indicates a degree of which sign information displayed by the road sign is obscured. The level of obscureness is then used as a visual cue or indicator that can be presented on a display of the UE 101. In one embodiment, the level of obscureness may be used as a variable that is compared with a threshold level. Once the threshold level is reached, the prediction platform 109 may generate a signal that requests a response, such as informing a local municipality, deploying a field personnel or a drone to improve visibility of the road sign, generating a navigational route to a destination that avoids the road sign, etc. Alternatively or additionally, the signal may cause the UE 101 (or the vehicle 115) to transition use of a first set among the sensors 105 to a second set among the sensors 105, alter weight of one or more of the sensors 105, or a combination thereof. By way of example, the signal may cause the UE 101 (or the vehicle 115) to switch from using a lidar to a standard camera for road observation or cause the UE 101 (or the vehicle 115) to use the standard camera more frequently than the lidar. In one embodiment, the prediction platform 109 may be unable to retrieve road sign attribute data for a given road sign from the database 111. In such embodiment, the prediction platform 109 may obtain a travel link associated with the UE 101. In one embodiment, the travel link includes road links (e.g., a stretch of road), nodes (e.g., points where two or more road links connect). The travel link may indicate a navigational route to a destination requested by a user of the UE 101. The travel link may be associated with data that indicates one or more road objects within the travel link. The prediction platform 109 may input the data to a machine learning model to predict a likelihood of at least one road sign existing within the travel link. For each road sign predicted to exist within the travel link, the prediction platform 109 predicts location of the road sign and at least one attribute of the road sign using one or more attributes associated with the travel link and receives weather forecast data indicating a weather forecast of the predicted location. Using the predicted attribute of the road sign and the weather forecast data, the prediction platform 109 identifies the state of visibility for the road sign. In one embodiment, the prediction platform 109 may predict whether sign information presented by a road sign is identifiable with respect to a human eye or a sensor. Based on the prediction, the prediction platform 109 may cause the UE 101 to indicate that the sign information will be identifiable with respect to a human eye or a sensor. In such embodiment, if the prediction platform 109 determines that the sign information will be identifiable with respect to the sensor, but not the human eye, the prediction platform 109 may determine whether one or more of the sensors 105 is the sensor that can identify the sign information and use the one or more of the sensors 105 to identify the sign information when the UE 101 encounters the road sign.

In one embodiment, the database 111 stores information on road links (e.g., road signs associated with road links, road length, road breadth, slope information, curvature information, etc.) and probe data for one or more road links (e.g., traffic density information). In one embodiment, the database 111 may include any multiple types of information that can provide means for aiding in the content provisioning and sharing process. Certain information stored in the database 111 may be historical data indicating past states of one or more road objects, past probe data, past traffic data, etc. In one embodiment, certain historical data may be associated with past weather conditions to provide context as to how certain past states of one or more road objects were affected by the past weather conditions. It should be appreciated that the information stored in the database 111 may be acquired from any of the elements within the system 100, other vehicles, sensors, database, or a combination thereof.

In the illustrated embodiment, the weather service platform 113 provides any type of weather data. In one embodiment, the weather service platform 113 provides weather forecast data such as precipitation type, precipitation intensity, air temperature, precipitation rate, and/or wind direction for one or more locations at one or more instances of time. The weather service platform 113 may be a US National Weather Service (NWS) platform, a Weather Channel platform, or any other local or national weather stations. The weather forecast data may be generated in a number of ways, such as through the use of various sensors, such as anemometers, wind vanes, pressure sensors, thermometers, hygrometers, rain gauges, doppler radars, or any combination thereof to live-track the current weather readings and build a weather forecast based on the readings. The data may also be updated, such as through on-the-ground crews used by the weather service platform 113 to confirm the weather forecast. Thus, while a weather forecast may be mapped to an area in real-time or near-real time (i.e., within seconds or minutes), the mapped region associated with the weather forecast may change as more data is gathered. In one embodiment, the weather forecast data may also be gathered based on crowd-sourcing, such as weather events identified through individual weather stations from which users share data. These weather stations may be small devices mounted at a property by an owner to contribute to the gathering of weather information which enhances weather forecasting. These weather stations may also be used to form a better understanding of where a weather event has taken place.

In one embodiment, the UE 101, the prediction platform 109, and the weather service platform 113 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of a database 111, e.g., a map database, according to one embodiment. In one embodiment, the database 111 includes geographic data 1001 used for (or configured to be compiled to be used for) mapping and/or navigation-related services. In one embodiment, the following terminology applies to the representation of geographic features in the database 111.

a. "Node"—A point that terminates a link.
b. "Line segment"—A straight line connecting two points.
c. "Link" (or "edge")—A contiguous, non-branching string of one or more line segments terminating in a node at each end.

In one embodiment, the database 111 follows certain conventions. For example, links do not cross themselves and do not cross each other except at a node. Also, there are no duplicated shape points, nodes, or links. Two links that connect each other have a common node.

As shown, the database 111 includes node data records 1003, road segment or link data records 1005, point of interest (POI) data records 1007, road sign records 1009, other records 1011, and indexes 1013, for example. More, fewer or different data records can be provided. In one embodiment, additional data records (not shown) can include cartographic ("carto") data records, routing data, and maneuver data. In one embodiment, the indexes 1013 may improve the speed of data retrieval operations in the database 111. In one embodiment, the indexes 1013 may be used to quickly locate data without having to search every row in the database 111 every time it is accessed.

In exemplary embodiments, the road segment data records 1005 are links or segments representing roads, streets, or paths, as can be used in the calculated route or recorded route information for determination of one or more personalized routes. The node data records 1003 are end points (such as intersections) corresponding to the respective links or segments of the road segment data records 1005. The road link data records 1005 and the node data records 1003 represent a road network, such as used by vehicles, cars, and/or other entities. Alternatively, the database 111 can contain path segment and node data records or other data that represent pedestrian paths or areas in addition to or instead of the vehicle road record data, for example.

Links, segments, and nodes can be associated with attributes, such as geographic coordinates, street names, address ranges, speed limits, turn restrictions at intersections, presence of a construction work site, and other navigation related attributes, as well as POIs, such as gasoline stations, hotels, restaurants, museums, stadiums, offices, automobile dealerships, auto repair shops, buildings, stores, parks, etc. The database 111 can include data about the POIs and their respective locations in the POI data records 1007. The database 111 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the database 111 can also include road sign records 1009 for storing road sign attribute data. The road sign attribute data can indicate a road sign location, sign information displayed by the road sign, a position of the road sign with respect to one or more attributes of links, segments, and nodes, an orientation of the road sign with respect to a ground of which the road sign is mounted or a road of which the road sign is associated with, a size of the road sign, a classification/type of the road sign, yaw, pitch, and roll angles of the road sign, a height of the road sign, a color of the road sign, composition of the road sign, etc. The road sign records 1009 can include information indicating whether a road sign is associated with a specific segment of a road link (as opposed to an entire link) and information indicating a flow of traffic that the road sign is designed to be associated with within a given node. In one embodiment, the road sign records 1009 can be associated with or integrated partially or wholly with one or more of the node records 1003, road segment records 1005, POI data records 1007, and/or other data record 1011.

Other records 1011 can include historical data indicating past states of one or more attributes of links, segments, nodes, and road signs. The past states may indicate a degree of obscureness of the one or more attributes for one or more past weather conditions or how the one or more attributes is obscured for a given past weather condition. In one embodiment, the past states may be recorded as probe data, and the probe data may be used as ground truth data. The ground truth data can be associated with a road object and a weather condition and used for training a machine learning model for predicting a state of visibility for the road object. In one embodiment, the historical data can indicate a degree of traffic associated with the one or more attributes, a frequency of a type of population group (e.g., locals and non-locals) using one or more of links, segments, nodes, or a combination thereof, records of when the one or more attributes was installed/replaced/removed, a frequency of accidents occurring within the one or more of links, segments, nodes, or a combination thereof. Other records 1011 may further include other road object data similar to the road sign data discussed above.

In one embodiment, the database 111 can be maintained by a content provider in association with a map developer. The map developer can collect geographic data to generate and enhance the database 111. There can be different ways used by the map developer to collect data. These ways can include obtaining data from other sources, such as municipalities or respective geographic authorities. In addition, the map developer can employ field personnel to travel by vehicle along roads throughout the geographic region to observe road signs and/or record information about them, for example. Also, remote sensing, such as aerial or satellite photography, can be used.

The database 111 can be a master database stored in a format that facilitates updating, maintenance, and development. For example, the master database or data in the master database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing machine learning of predicting a state of visibility for a road sign may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 2:
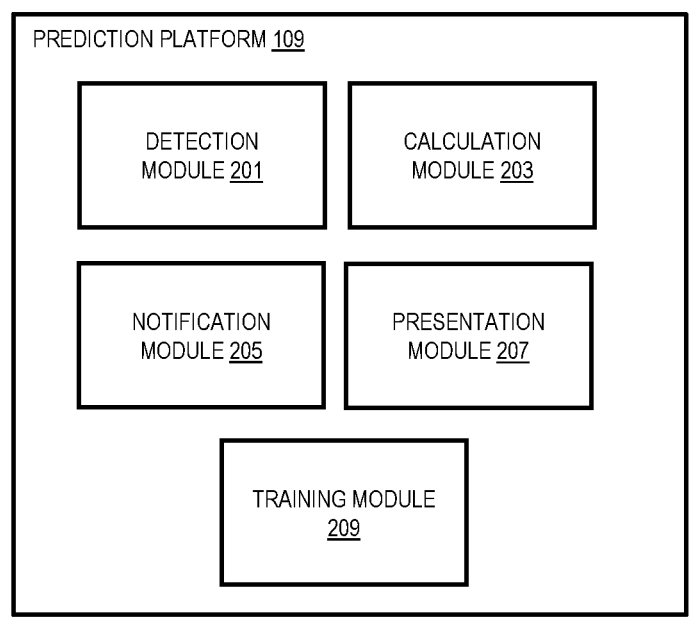
FIG. 2 illustrates a diagram of components of the prediction platform of FIG. 1.

FIG. 2 is a diagram of the components of the prediction platform 109, according to one embodiment. By way of example, the prediction platform 109 includes one or more components for predicting a state of visibility for a road sign using road sign attribute data and weather forecast data. It is contemplated that the functions of these components may be combined in one or more components or performed by other components of equivalent functionality. In this embodiment, the prediction platform 109 includes detection module 201, calculation module 203, notification module 205, presentation module 207, and training module 209.

In one embodiment, the detection module 201 may receive probe data including location information, speed information, timestamp information, or a combination thereof for the UE 101, traffic density information for the travel link or the road segment/link, or a combination thereof. In one embodiment, the detection module 201 may detect a travel link input via the UE 101 and further detects one or more attributes associated with the travel link. In one embodiment, the detection module 201 may automatically detect a current road segment/link of which the UE 101 is traversing and further detects one or more attributes associated with a portion of the road segment/link that the UE 101 has yet to traverse. The one or more attributes includes road sign presence information, slope information, curvature information, lanes information, width information, or a combination thereof. Using the road sign presence information, the detection module 201 may detect at least one road sign that the UE 101 is about to encounter within the travel link or the road segment/link of which the UE 101 is traversing. In one embodiment, the detection module 201 may detect that the UE 101 has encountered a road sign when the UE 101 is within a predetermined distance from the road sign. By way of example, the predetermined distance may be ±30 meters to account for GPS uncertainty. It should be appreciated that the predetermined distance may be configured by a user through the UE 101. For each detected road sign, the detection module 201 detects at least one road sign attribute data associated with the road sign and weather forecast data associated with the location of the road sign. It should be appreciated that the detection module 201 may receive any data from any of the components within the system 100.

In one embodiment, the calculation module 203 may use the road sign attribute data and the weather forecast data to identify a state of visibility of a road sign. The calculation module 203 inputs the road sign attribute data and the weather forecast data to a machine learning model to derive a level of obscureness, where the level of obscureness indicates a degree of which sign information displayed by the road sign is obscured. The weather forecast data may include precipitation type, precipitation intensity, air temperature, precipitation rate, and wind direction, and the road sign attribute data may include an angle of which a sign board of the road sign faces an incoming traffic of the road segment/link. The state of visibility of the road sign may simply indicate that the road sign is obscured or not obscured or that the road sign is mildly obscured, moderately obscured, severely obscured, or completely obscured. As to the level of obscureness, the level may be indicated as a percentage.

In one embodiment, if a state of visibility of a road sign is slightly obscured, the calculation module 203 may determine whether the road sign information of the road sign is identifiable. In such embodiment, the calculation module 203 may rely on the machine learning model to determine whether the sign information is identifiable for a given level of obscureness.

In one embodiment, the calculation module 203 may predict whether sign information presented by a road sign is identifiable with respect to a human eye or a sensor by relying on the machine learning module. In such embodiment, the machine learning module is trained to identify sign information from: (1) a first plurality of images of an obscured road sign that is captured using image capturing devices that mimic the way a human eye would see an image (e.g., a standard camera); and (2) a second plurality of images of the obscured road sign that is captured using image capturing devices that are different than the way a human eye would see an image (e.g., an infrared camera). In one embodiment, if the calculation module 203 determines that the sign information will be identifiable with respect to the sensor, but not the human eye, the calculation module 203 may: (1) receive sensor attribute data from the sensors 105; (2) determine whether one or more of the sensors 105 is the sensor that can identify the sign information; and (3) responsive to the sensors 105 including the one or more sensors, use the one or more of the sensors 105 to identify the sign information when the UE 101 encounters the road sign.

In one embodiment, if the calculation module 203 determines that a state of visibility for a road sign will be obscured, the calculation module 203 may predict an object (e.g., snow, rain) that will obscure the road sign using weather forecast data and road sign attribute data. By way of example, the weather forecast data may indicate that the precipitation type is "freezing or frozen," the air temperature is below 5 degree Celsius, and the wind direction is a first direction, and the road sign attribute data may indicate that a sign face of the road sign is in the first direction. Given these conditions, the calculation module 203 may predict that a sheet of snow/ice will form on the surface of the sign face. It is contemplated that different combinations of variables from the weather forecast data and the road sign attribute data are associated with different formations of the object that obscures the road sign. For example, an angle of which the sign face faces the wind direction impacts how the sheet of snow/ice forms on the surface of the sign face. Therefore, in one embodiment, the calculation module 203 may further predict a location of the object with respect to the road sign, a size of the object, a density of the object, or a combination thereof.

In one embodiment, the calculation module 203 determines a duration of which the level of obscureness is maintained using the road sign attribute data and the weather forecast data. In one embodiment, the calculation module 203 may use probe data to calculate a time of which the UE 101 encounters the road sign. Using the road sign attribute data and the weather forecast data, the calculation module 203 may identify the state of visibility or the level of obscureness for the road sign at the time of which the UE 101 encounters the road sign.

In one embodiment, the road sign presence information may be unavailable, or the calculation module 203 is uncertain whether the travel link or the road segment/link of which the UE 101 is traversing includes a road sign. In such embodiment, the calculation module 203 may calculate a likelihood of at least one road sign existing within the travel link or the road segment/link of which the UE 101 is traversing by using the machine learning model. The calculation module 203 can refer to one or more attributes associated the travel link or the road segment/link as context for: (1) predicting the likelihood of a road sign existing within the travel link or the road segment; (2) predicting the location of the road sign; and (3) predicting at least one attribute of the road sign. By way of example, the one or more attributes associated with the travel link may be a construction zone existing within the travel link, and the machine learning model may indicate that the likelihood of encountering a road sign within a construction zone is high. If the calculation module 203 determines that at least one road sign exists within the travel link or the road segment/link, the calculation module 203 may: (1) predict a location of the road sign; (2) predict at least one attribute associated with the road sign; (3) identify a weather forecast associated with the location; and (4) identify a state of visibility for the road sign using the at least one attribute and the weather forecast data. For example, continuing from the example above, the calculation module 203 may refer to the machine learning model to determine that the location of the road sign is likely to exist at the start of the construction zone and that the attribute of the road sign may be a sign information indicating vehicles to slow down.

In one embodiment, the calculation module 203 may use data from the database 111 to generate data that is unavailable within the database 111 for contextual information. For example, the calculation module 203 may retrieve from the database 111 road sign attribute data indicating a length of a signpost and an angle of which the signpost is connected to the ground. Assuming that the database 111 lacks road sign attribute data indicating a height of the signpost with respect to the ground, the calculation module 203 may calculate the height using road sign attribute data indicating the length of the sign post and the angle of which the sign post is connected to the ground by applying a simple geometric equation.

In one embodiment, if a state of visibility for a road sign indicates obscurity of a level of obscureness reaches a threshold, the calculation module 203 may generate a signal that cause the UE 101 (or the vehicle 115) to transition use of a first set among the sensors 105 to a second set among the sensors 105, alter weight of one or more of the sensors 105, or a combination thereof. By way of example, the signal may cause the UE 101 (or the vehicle 115) to switch from using a lidar to a standard camera for road observation or cause the UE 101 (or the vehicle 115) to use the standard camera more frequently than the lidar for the road observation.

In one embodiment, if a state of visibility for a road sign indicates obscurity of a level of obscureness reaches a threshold, the calculation module 203 may generate a signal that cause the vehicle 115 to transition from an autonomous mode to a manual mode.

In one embodiment, the notification module 205 may cause a notification to UE 101 on the state of visibility and/or the level of obscureness for the road sign. In one embodiment, notification may indicate that the state of visibility and/or the level of obscureness at a time of which the UE 101 encounters the road sign. In one embodiment, the notification module 205 may cause an alarm notification if the state of visibility indicates obscurity and/or the level of obscureness reaches a threshold level. The one or more notification may include sound notification, display notification (e.g., a color representation of the location for the obscured road sign in a mapping interface), vibration, or a combination thereof.

In one embodiment, the presentation module 207 obtains a set of information, data, and/or calculated results from other modules, and continues with providing a presentation of a map including the UE 101, a travel link or a road segment/link of which the UE 101 is traversing, at least one road sign associated with the travel link or the road segment/link, and at least one visual indicator indicating the state of visibility and/or the level of obscureness of the at least one road sign. In one embodiment, the presentation module 207 may superimpose the at least one visual indicator indicating the state of visibility and/or the level of obscureness of the road sign on a display including a navigational route to a destination.

In one embodiment, the training module 209 may embody the machine learning models and train the machine learning model. By way of example, the machine learning model may be random forest, logistic, decision trees, neural networks, or a combination thereof. The machine learning model may be trained using the historical data. The historical data may include past records of: (1) road sign attribute data indicating at least one attribute of the road sign; (2) historical weather data indicating a historical weather condition of a location in which the road sign is disposed; and (3) ground truth data indicating a true state of which sign information is displayed by the road sign. The machine learning model may be trained by associating variables from the road sign attribute data and the historical weather data to the ground truth data. In practice, the machine learning model may receive road sign attribute data and weather forecast data and automatically associate a combination of variables from the road sign attribute data and the weather forecast data to a specific state of visibility or level of obscureness. It should be appreciated that the machine learning model may be continuously trained by using probe data after being trained and deployed for use.

In one embodiment, the machine learning model may automatically associate one or more attributes of a travel link or a road segment/link as an indicator for at least one road sign existing within the travel link or the road segment/link. In such embodiment, the machine learning model may derive at least one attribute of the road sign predicted exist within the travel link or the road segment/link using the one or more attributes of the travel link or the road segment/link as contextual information.

In one embodiment, the machine learning model may be trained to identify road information presented by a road sign is associated with a given level of obscureness. The machine learning model may be trained to provide such identification using past images of one or more road signs having one or more levels of obscureness.

In one embodiment, the machine learning module is trained to predict an object that is to obscure a road sign and at least one attribute of the object (e.g., a location of the object with respect to the road sign, a size of the object, a density of the object) based on the weather forecast data and the road sign attribute data. The machine learning module may be trained to render such prediction using historical data associated with the road sign.

The above presented modules and components of the prediction platform 109 can be implemented in hardware, firmware, software, or a combination thereof. Though depicted as a separate entity in FIG. 1, it is contemplated that the prediction platform 109 may be implemented for direct operation by the UE 101. As such, the prediction platform 109 may generate direct signal inputs by way of the operating system of the UE 101 for interacting with the applications 103. In another embodiment, one or more of the modules 201-209 may be implemented for operation by the UE 101, as the prediction platform 109, or a combination thereof. The various executions presented herein contemplate any and all arrangements and models.

Figure 3:
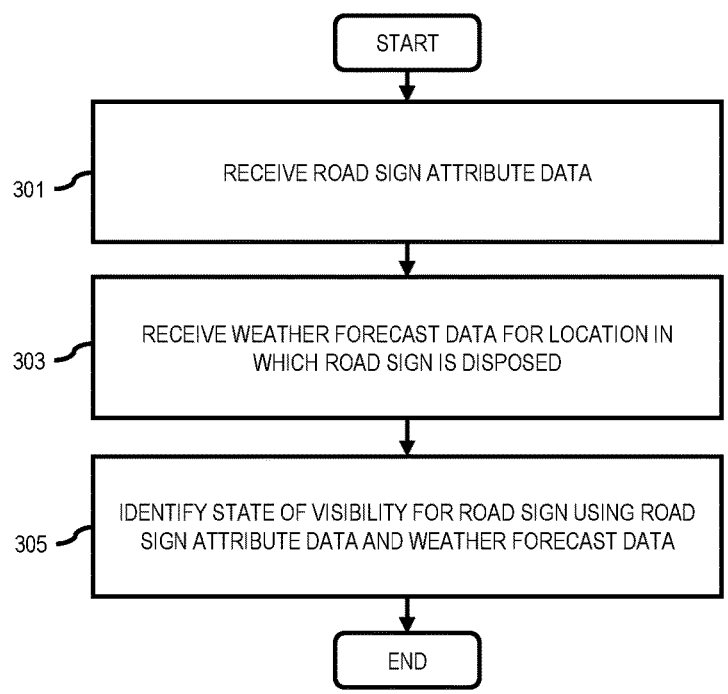
FIG. 3 illustrates a flowchart of a process for causing a predicting a state of visibility for a road object.
Figure 10:
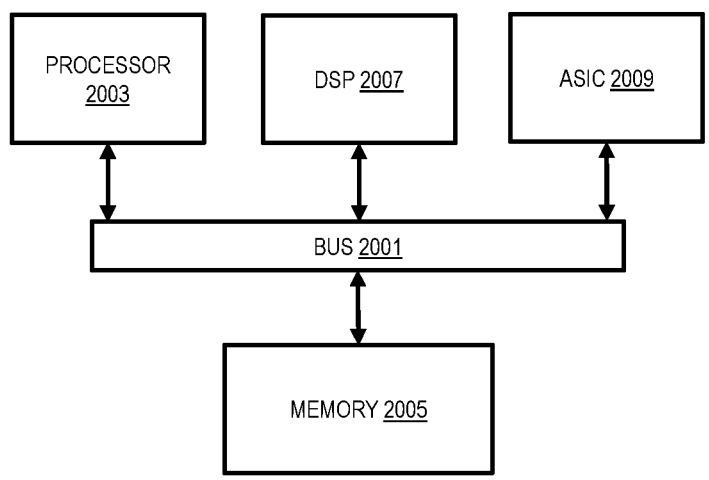
FIG. 10 illustrates a chip set or chip upon which an embodiment may be implemented.

FIG. 3 is a flowchart of a process 300 for causing a predicting a state of visibility for a road sign, according to one embodiment. In one embodiment, the assessment platform 109 performs the process 300 and is implemented in, for instance, a chip set including a processor and a memory as shown in FIG. 10. Additional, fewer, or different steps may be provided.

In step 301, the prediction platform 109 may receive a road sign attribute data indicating at least one attribute of a road sign. The road sign attribute data indicates, at least, the location of the road sign location. The road sign attribute data may further indicate sign information displayed by the road sign, a position of the road sign with respect to one or more attributes of links, segments, and nodes, an orientation of the road sign with respect to a ground of which the road sign is mounted or a road of which the road sign is associated with, a size of the road sign, a classification/type of the road sign, yaw, pitch, and roll angles of the road sign, a height of the road sign, a color of the road sign, composition of the road sign, or a combination thereof. In one embodiment, the road signa attribute data is provided from the database 111.

In step 303, the prediction platform 109 may receive a weather forecast data indicating a weather forecast for the location in which the road sign is disposed. The weather forecast data may indicate precipitation type, precipitation intensity, air temperature, precipitation rate, wind direction, or a combination thereof for a given location. In one embodiment, the prediction platform 109 receives the weather forecast data from the weather service platform 113.

In step 305, the prediction platform 109 may use the road sign attribute data and the weather forecast data to identify a state of visibility or a level of obscureness for the road sign. Specifically, the prediction platform 109 inputs the road sign attribute data and the weather forecast data to a machine learning model to predict a state of visibility of the road sign. The prediction platform 109 automatically associates a combination of variables from the road sign attribute data and the weather forecast data to a specific state of visibility or level of obscureness. Subsequently, the prediction platform 109 may inform the UE 101 the state of visibility or level of obscureness.

Figure 4:
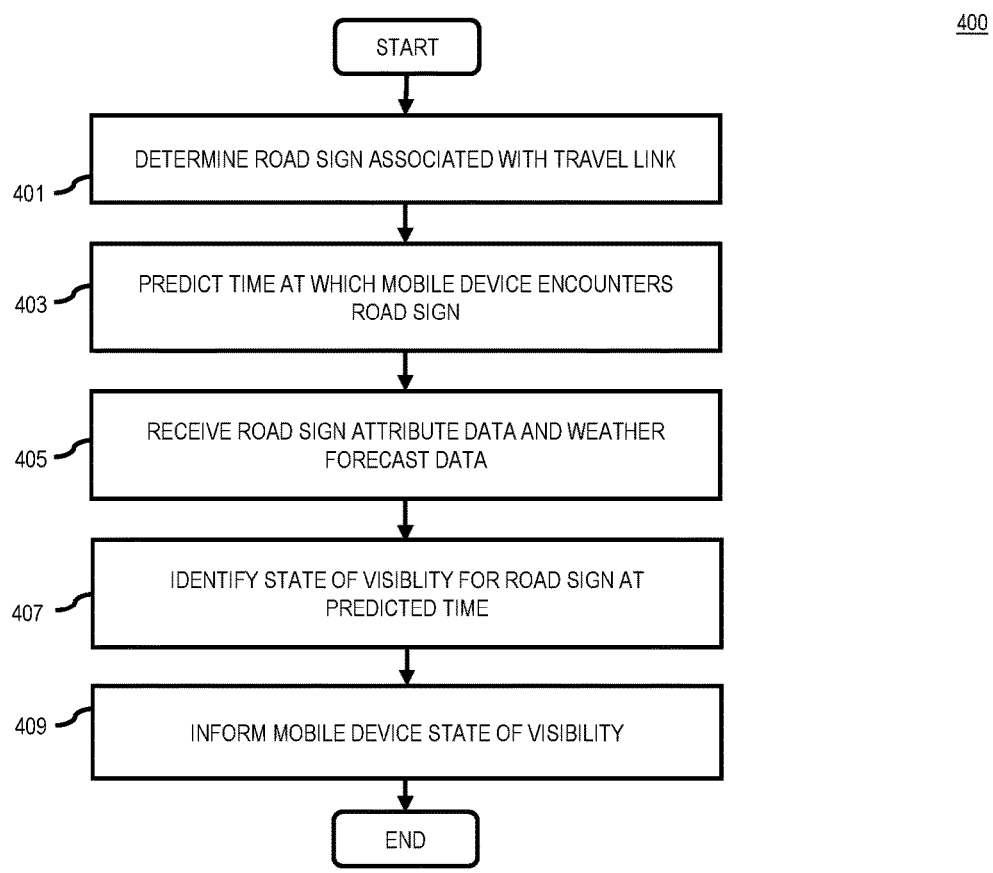
FIG. 4 illustrates a flowchart of a process for predicting a state of visibility for a road object at a time of which the UE of FIG. 1 encounters the road object.

FIG. 4 is a flowchart of a process 400 for predicting a state of visibility for a road sign at a time of which the UE 101 encounters the road sign, according to one embodiment. In one embodiment, the prediction platform 109 performs the process 400 and is implemented in, for instance, a chip set including a processor and a memory as shown in FIG. 10. Additional, fewer, or different steps may be provided.

In step 401, the prediction platform 109 may receive a request for navigating the UE 101 to a destination. In an alternative embodiment, the prediction platform 109 may not explicitly receive the request but may be aware that the UE 101 is navigating to the destination. In response, the prediction platform 109 may identify a travel link to the destination and determine whether: (1) the travel link is associated with at least one road sign; and (2) the UE 101 is about to encounter a road sign.

In step 403, if the prediction platform 109 determines that the travel link is associated with at least one road sign and that the UE 101 is about to encounter a road sign, the prediction platform predicts a time at which the UE 101 encounters the road sign using probe data. The prediction of the time may be based on traffic density information associated with the road segment/link that includes the road sign.

In step 405, the prediction platform 109 receives road sign attribute data indicating at least one attribute of the road sign and weather forecast data indicating a weather forecast of a location in which the road sign is disposed.

In step 407, the prediction platform 109 inputs the road sign attribute data and the weather forecast to the machine learning model to predict a state of visibility or a level of obscureness for the road sign at the predicted time.

In step 409, the prediction platform 109 informs the UE 101 of the state of visibility or the level of obscureness for the road sign at the predicted time. The prediction platform 109 may convey such information to UE 101 using sound notification, display notification, vibration, or a combination thereof.

Figure 5:
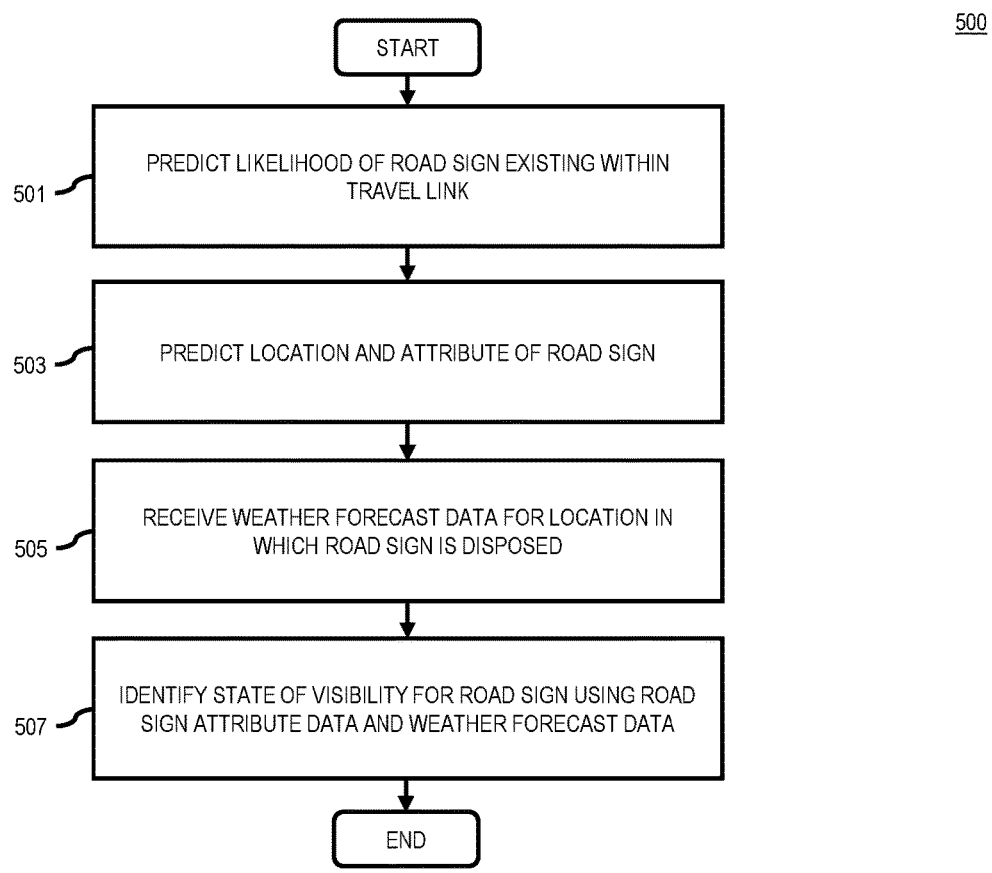
FIG. 5 illustrates a flowchart of a process for predicting a likelihood of a road object existing within a travel link and predicting a state of visibility for the predicted road object.

FIG. 5 is a flowchart of a process 500 for predicting a likelihood of a road sign existing within a travel link and predicting a state of visibility for the predicted road sign, according to one embodiment. In one embodiment, the prediction platform 109 performs the process 500 and is implemented in, for instance, a chip set including a processor and a memory as shown in FIG. 10. Additional, fewer, or different steps may be provided.

In step 501, the prediction platform 109 receives a travel link from the UE 101. In response, the prediction platform 109 may determine whether the travel link is associated with at least one road sign. If the prediction platform 109 fails to determine that the travel link is associated with at least one road sign (e.g., the database 111 lacking information regarding the travel link), the prediction platform 109 identifies at least one attribute of the travel link and predicts a likelihood of a road sign existing within a portion of the travel link that the UE 101 has yet to traverse using the at least one attribute of the travel link. The prediction platform 109 may input the at least one attribute of the travel link to the machine learning model to derive the likelihood of the road sign existing within the portion. In one embodiment, the prediction platform 109 may automatically identify a road segment/link of which the UE 101 is traversing and predict a likelihood of a road sign existing within a portion of the road segment/link of which the UE 101 has yet to traverse.

In step 503, if the prediction platform 109 predicts that a road sign is likely to exist within the portion of the travel link or road segment/link that the UE 101 has yet to traverse, the prediction platform 109 further predicts the location of the road sign and at least one attribute of the road sign using the one or more attributes associated with the travel link or the road segment/link.

In step 505, the prediction platform 109 receives weather forecast data indicating weather forecast associated with the location of the road sign. The weather forecast data may indicate precipitation type, precipitation intensity, air temperature, precipitation rate, wind direction, or a combination thereof fora given location. In one embodiment, the prediction platform 109 receives the weather forecast data from the weather service platform 113.

In step 507, the prediction platform 109 identifies a state of visibility for the road sign that is predicted to exist within the portion using the at least one attribute of the road sign and the weather forecast data. Specifically, the prediction platform 109 inputs the road sign attribute data and the weather forecast data to a machine learning model to predict a state of visibility of the predicted road sign. The prediction platform 109 automatically associates a combination of variables from the road sign attribute data and the weather forecast data to a specific state of visibility or level of obscureness. Subsequently, the prediction platform 109 may inform the UE 101 the state of visibility or level of obscureness.

Figure 6:
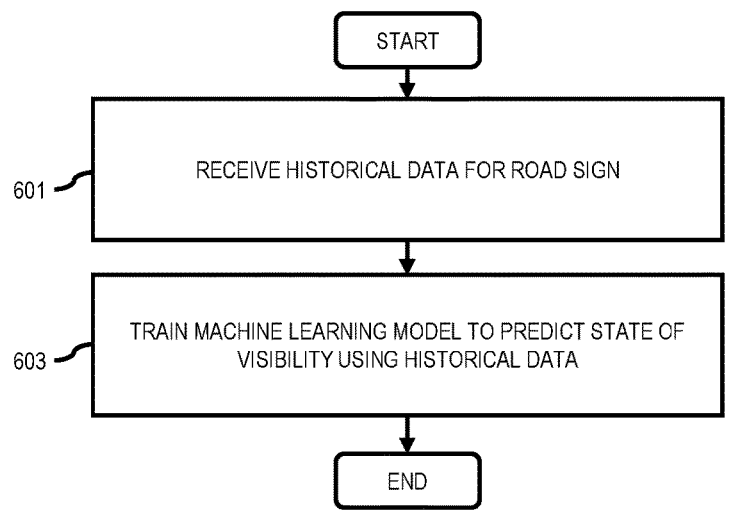
FIG. 6 illustrates a flowchart of a process for training a machine learning model for predicting a state of visibility for a road object.

FIG. 6 is a flowchart of a process 600 for training a machine learning model for predicting a state of visibility for a road sign. In one embodiment, the prediction platform 109 performs the process 600 and is implemented in, for instance, a chip set including a processor and a memory as shown in FIG. 10. Additional, fewer, or different steps may be provided.

At step 601, the prediction platform 109 receives from the database 111 historical data for a road sign. The historical data may include past records of: (1) road sign attribute data indicating at least one attribute of the road sign; (2) historical weather data indicating a historical weather condition of a location in which the road sign is disposed; and (3) ground truth data indicating a true state of which sign information is displayed by the road sign.

At step 603, the prediction platform 109 trains the machine learning model to predict the state of visibility using the historical data. The machine learning model may be trained by associating variables from the road sign attribute data and the historical weather data of the past records to the ground truth data of the past records.

FIG. 7 is an example table 700 of historical data used to train a machine learning model for predicting a state of visibility for a road sign. The historical data includes weather forecast data, road sign attribute data, and ground truth data. In illustrated example, the weather forecast data indicates precipitation type 701, precipitation rate 703, precipitation intensity 705, wind direction 707, and air temperature 709 for the location in which the road sign is disposed. The road sign attribute data indicates a sign face angle 711 of the road sign. The ground truth data 713 indicates "obscured" or "not-obscured." Rows of the table 700 may indicate different instances of which weather forecast data, road sign attribute data, and ground truth data were recorded. In this example, a machine learning model, such as random forest, may be trained using the table 700. It should be appreciated that any number and/or type of weather forecast data and road sign attribute data may be recorded for the ground truth data.

Figure 8:
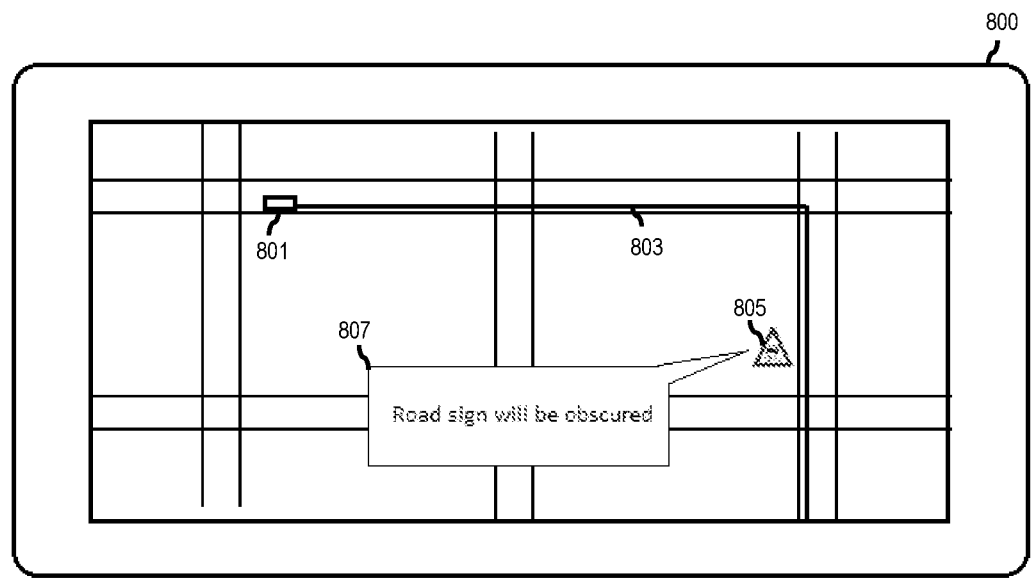
FIG. 8 illustrates an example user interface displaying a map.

FIG. 8 is an example user interface 800, such as a UI of the UE 101, displaying a map. In the illustrated example, the user interface 800 displays a map including a vehicle model 801 indicating the current position of the vehicle 115, a travel link 803 to a destination, a road sign 805 disposed at a location within the map, and a message 807 indicating, at least, a state of visibility for the road sign 805. In the illustrated embodiment, the user interface 800 may be an example component of the UE 101. In the illustrated embodiment, the message 807 informs a user that the road sign 805 will be obscured. In alternative embodiments, the message 807 may convey information regarding a time of which the vehicle encounters the obscured road sign 805, a level of obscureness, a current state of visibility for the road sign, at least one road sign attribute, or a combination thereof. It should be appreciated that the map displayed by the user interface may include one or more elements that are based on real time variables, one or more elements that based on future time variables, or a combination thereof. For example, said real time-based variable may be a current state of visibility for a road sign and said future time-based variable may be a state of visibility for a road sign at a future time of which a vehicle encounters the road sign.

The system, apparatus, and methods described herein enable a user to predict a state of visibility for a road sign using road sign attribute data and weather forecast data, thereby: (1) improving road safety; (2) improving navigation systems; and (3) reducing resources needed for examining the state of visibility for a plurality of road signs. By way of example, road safety is improved in that the prediction enables an operator of a vehicle to be aware of a state of a road sign and readily prepare to perform an appropriate response to road sign information of the road sign before the vehicle encounters the road sign. Navigation systems are improved in that the prediction enables the systems to provide notifications regarding the state of visibility and provide one or more alternative travel links that avoids the road sign. Further, manpower and/or processing resources required by image processing devices, such as drones, probe vehicles, and cameras, for examining a state of visibility for a plurality of road signs are reduced since the prediction provides the state of visibility for the plurality of road signs.

The processes described herein for predicting a state of visibility for a road sign using road sign attribute data and weather forecast data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
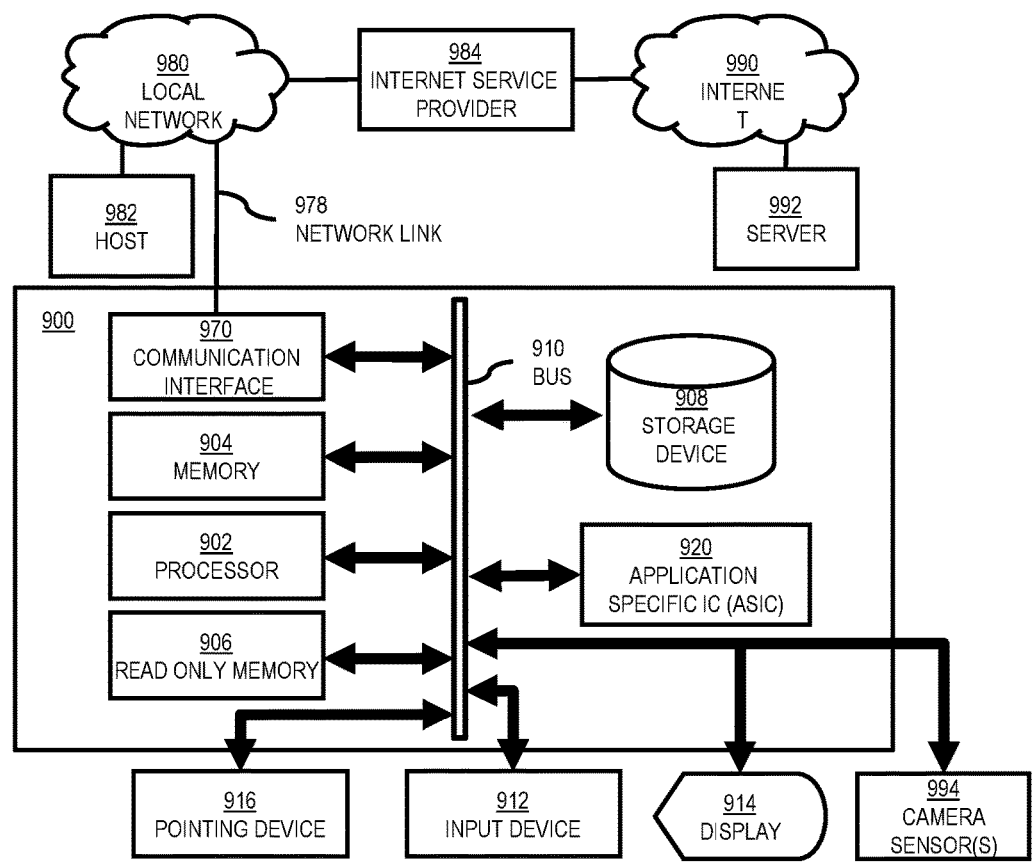
FIG. 9 illustrates a computer system upon which an embodiment may be implemented.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to determine safety levels for one or more travel links based, at least in part, on signage information as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of determining safety levels for one or more travel links based, at least in part, on signage information.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to determining safety levels for one or more travel links based, at least in part, on signage information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for determining safety levels for one or more travel links based, at least in part, on signage information. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for determining safety levels for one or more travel links based, at least in part, on signage information, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 9144 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for determining safety levels for one or more travel links based, at least in part, on signage information to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 982 connected to the Internet hosts a process that provides a service in response to information received over the Internet. For example, server host 982 hosts a process that provides information representing video data for presentation at display 914. It is contemplated that the components of system 900 can be deployed in various configurations within other computer systems, e.g., host 982 and server 982.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 982 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to determine safety levels for one or more travel links based, at least in part, on signage information as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of determining safety levels for one or more travel links based, at least in part, on signage information.

In one embodiment, the chip set or chip 1000 includes a communication mechanism such as a bus 2001 for passing information among the components of the chip set 1000. A processor 2003 has connectivity to the bus 2001 to execute instructions and process information stored in, for example, a memory 2005. The processor 2003 may include one or more processing cores with each core configured to perform independently. A multi-core processor enables multiprocessing within a single physical package. Examples of a multi-core processor include two, four, eight, or greater numbers of processing cores. Alternatively or in addition, the processor 2003 may include one or more microprocessors configured in tandem via the bus 2001 to enable independent execution of instructions, pipelining, and multithreading. The processor 2003 may also be accompanied with one or more specialized components to perform certain processing functions and tasks such as one or more digital signal processors (DSP) 2007, or one or more application-specific integrated circuits (ASIC) 2009. A DSP 2007 typically is configured to process real-world signals (e.g., sound) in real-time independently of the processor 2003. Similarly, an ASIC 2009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors. The processor 2003 and accompanying components have connectivity to the memory 2005 via the bus 2001. The memory 2005 includes both dynamic memory (e.g., RAM, magnetic disk, writable optical disk, etc.) and static memory (e.g., ROM, CD-ROM, etc.) for storing executable instructions that when executed perform the inventive steps described herein to determine safety levels for one or more travel links based, at least in part, on signage information. The memory 2005 also stores the data associated with or generated by the execution of the inventive steps.

Figure 11:
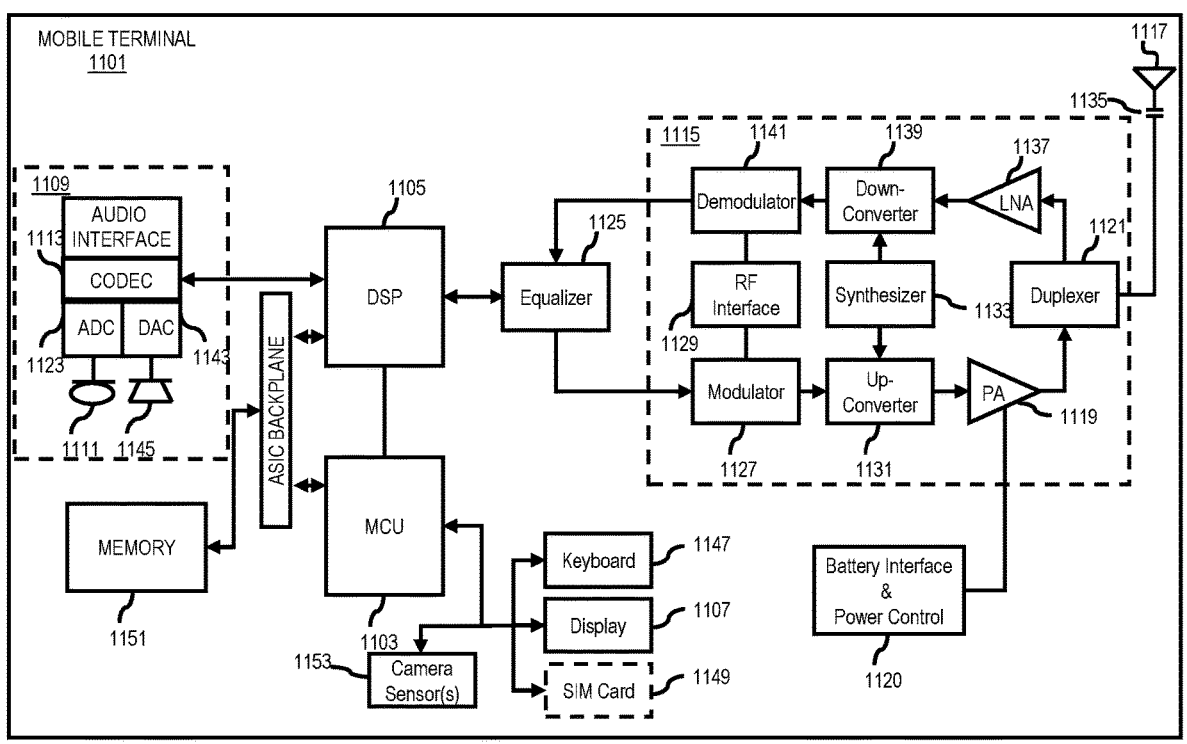
FIG. 11 illustrates is a diagram of exemplary components of a mobile terminal for communications, which is capable of operating in the system of FIG. 1.

FIG. 11 is a diagram of exemplary components of a mobile terminal 1101 (e.g., a mobile device or vehicle or part thereof) for communications, which is capable of operating in the system of FIG. 1, according to one embodiment. In some embodiments, mobile terminal 1101, or a portion thereof, constitutes a means for performing one or more steps of determining safety levels for one or more travel links based, at least in part, on signage information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of determining safety levels for one or more travel links based, at least in part, on signage information. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to determine safety levels for one or more travel links based, at least in part, on signage information. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. A non-transitory computer-readable storage medium having computer program code instructions stored therein, the computer program code instructions, when executed by at least one processor, cause the at least one processor to:
   receive road sign attribute data indicating at least one attribute of a road sign;
   receive weather forecast data indicating a weather forecast of a location in which the road sign is disposed; and
   using the road sign attribute data and the weather forecast data, identify a state of visibility for the road sign.

2. The non-transitory computer-readable storage medium of claim 1, wherein the at least one attribute is the location of the road sign, an orientation of the road sign, a size of the road sign, a classification of the road sign, yaw, pitch, and roll angles of the road sign, a height of the road sign, a color of the road sign, or a combination thereof.

3. The non-transitory computer-readable storage medium of claim 1, wherein the weather forecast data includes a forecasted precipitation type, a forecasted precipitation intensity, a forecasted air temperature, a forecasted precipitation rate, a forecasted wind direction, or a combination thereof.

4. The non-transitory computer-readable storage medium of claim 1, wherein the computer program code instructions, when executed by the at least one processor, cause the at least one processor to identify the state of visibility by determining a level of obscureness using the road sign attribute data and the weather forecast data, the level of obscureness indicating a degree of which sign information displayed by the road sign is obscured.

5. The non-transitory computer-readable storage medium of claim 4, wherein the computer program code instructions, when executed by the at least one processor, cause the at least one processor to determine the level of obscureness by:
   inputting the road sign attribute data and the weather forecast data to a machine learning model; and
   deriving the level of obscureness from the machine learning model.

6. The non-transitory computer-readable storage medium of claim 5, wherein the machine learning model is random forest, logistic, decision trees, neural networks, or a combination thereof.

7. The non-transitory computer-readable storage medium of claim 5, wherein the computer program code instructions, when executed by the at least one processor, cause the at least one processor to, subsequent to or prior to generating the level of obscureness:
   receive ground truth data indicating a true state of which the sign information is displayed; and
   train the machine learning model using the ground truth data.

8. The non-transitory computer-readable storage medium of claim 4, wherein the computer program code instructions, when executed by the at least one processor, cause the at least one processor to determine a duration of which the level of obscureness is maintained subsequent to determining the level of obscureness.

9. The non-transitory computer-readable storage medium of claim 4, wherein the computer program code instructions, when executed by the at least one processor, cause the at least one processor to generate a map including at least one indicator indicating the level of obscureness.

10. The non-transitory computer-readable storage medium of claim 4, wherein the computer program code instructions, when executed by the at least one processor, cause the at least one processor to:
    determine whether the level obscureness reaches a threshold; and
    responsive to determining that the level of obscureness reaching the threshold, generate a signal informing a local municipality.

11. The non-transitory computer-readable storage medium of claim 4, wherein the computer program code instructions, when executed by the at least one processor, cause the at least one processor to:
    determine whether the level obscureness reaches a threshold; and
    responsive to determining that the level of obscureness reaching the threshold, generate a signal configured to cause deployment of a drone.

12. The non-transitory computer-readable storage medium of claim 4, wherein the level of obscureness is generated based on visibility of the sign information with respect to a human eye.

13. The non-transitory computer-readable storage medium of claim 4, wherein the level of obscureness is generated based on visibility of the sign information with respect to a sensor.

14. The non-transitory computer-readable storage medium of claim 4, wherein the computer program code instructions, when executed by the at least one processor, cause the at least one processor to, responsive to the level of obscureness reaching a threshold:

using the road sign attribute data and the weather forecast data, predict at least one attribute of an object obscuring the road sign; and using the at least one attribute of the object, predict whether the sign information can be identified.

15. The non-transitory computer-readable storage medium of claim 14, wherein the at least one attribute of the object is a location of the object with respect to the road sign, a size of the object, a density of the object, or a combination thereof.

16. An apparatus comprising at least one processor and at least one non-transitory memory including computer program code instructions, the computer program code instructions configured to, when executed, cause the apparatus to:

receive a request for navigating a mobile device to a destination;

identify a travel link to the destination;

receive attribute data indicating at least one attribute of a road object associated with the travel link;

receive weather forecast data indicating a weather forecast of a location in which the road object is disposed; and using the attribute data and the weather forecast data, identify a state of visibility for the road object.

17. The apparatus of claim 16, wherein the instructions, when executed, further cause the apparatus to generate a signal for a navigation related function based on the state of visibility, and wherein the signal includes information regarding an alternative travel link to the destination that avoids the road object.

18. The apparatus of claim 16, wherein the instructions, when executed, further cause the apparatus to generate a signal for a navigation related function based on the state of visibility, wherein the mobile device is associated with a vehicle comprising a plurality of sensors, and wherein the signal causes the vehicle to transition use of a first set among the plurality of sensors to a second set among the plurality of sensors, alter weight of one or more of the plurality of sensors, or a combination thereof.

19. The apparatus of claim 16, wherein the instructions, when executed, further cause the apparatus to generate a signal for a navigation related function based on the state of visibility, wherein the mobile device is associated with a vehicle configured to operate in a manual mode or an autonomous mode, and wherein the signal causes the vehicle to transition from the autonomous mode to the manual mode.

20. An apparatus comprising at least one processor and at least one non-transitory memory including computer program code instructions, the computer program code instructions configured to, when executed, cause the apparatus to:

predict a likelihood of at least one road sign existing within a travel link; and for a road sign predicted to exist within the travel link:
predict a location of the road sign and at least one attribute of the road sign using one or more attributes associated with the travel link;

receive weather forecast data indicating a weather forecast of the location; and identify a state of visibility for the road sign using the at least one attribute and the weather forecast data.

21. A method of training a machine learning model for predicting a state of visibility for a road sign, the method comprising:

receiving historical data for the road sign, the historical data including, for each of at least one past time or duration:

road sign attribute data indicating at least one attribute of the road sign;

historical weather data indicating a historical weather condition of a location in which the road sign is disposed; and ground truth data indicating a true state of which sign information is displayed by the road sign; and training the machine learning model to predict the state of visibility using the historical data.

* * * * *